July 6, 1965 V. A. IANNUCCI 3,192,684
APPARATUS FOR MAKING PACKAGE TAPES
Filed March 12, 1962 11 Sheets-Sheet 4
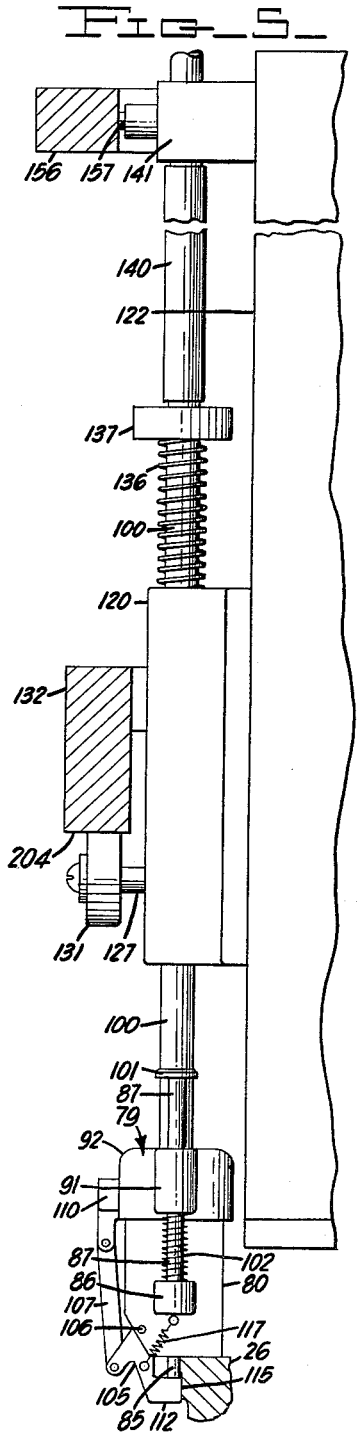
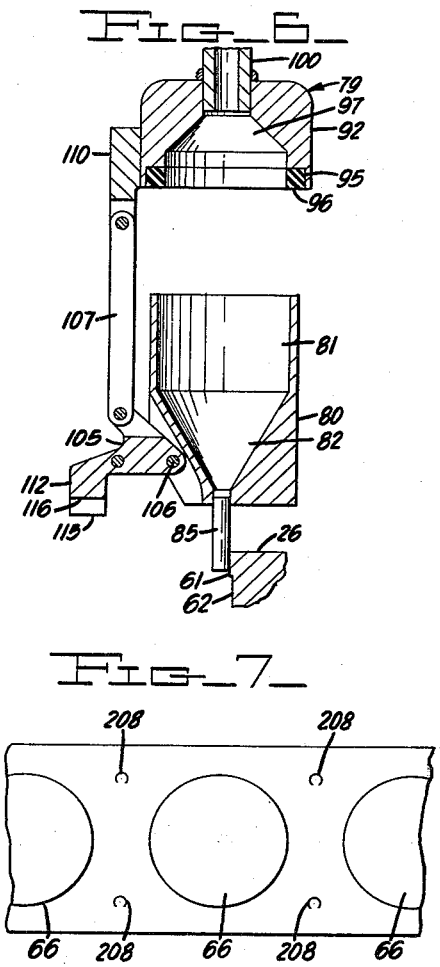
INVENTOR.
Vincent A. Iannucci
BY
ATTORNEYS

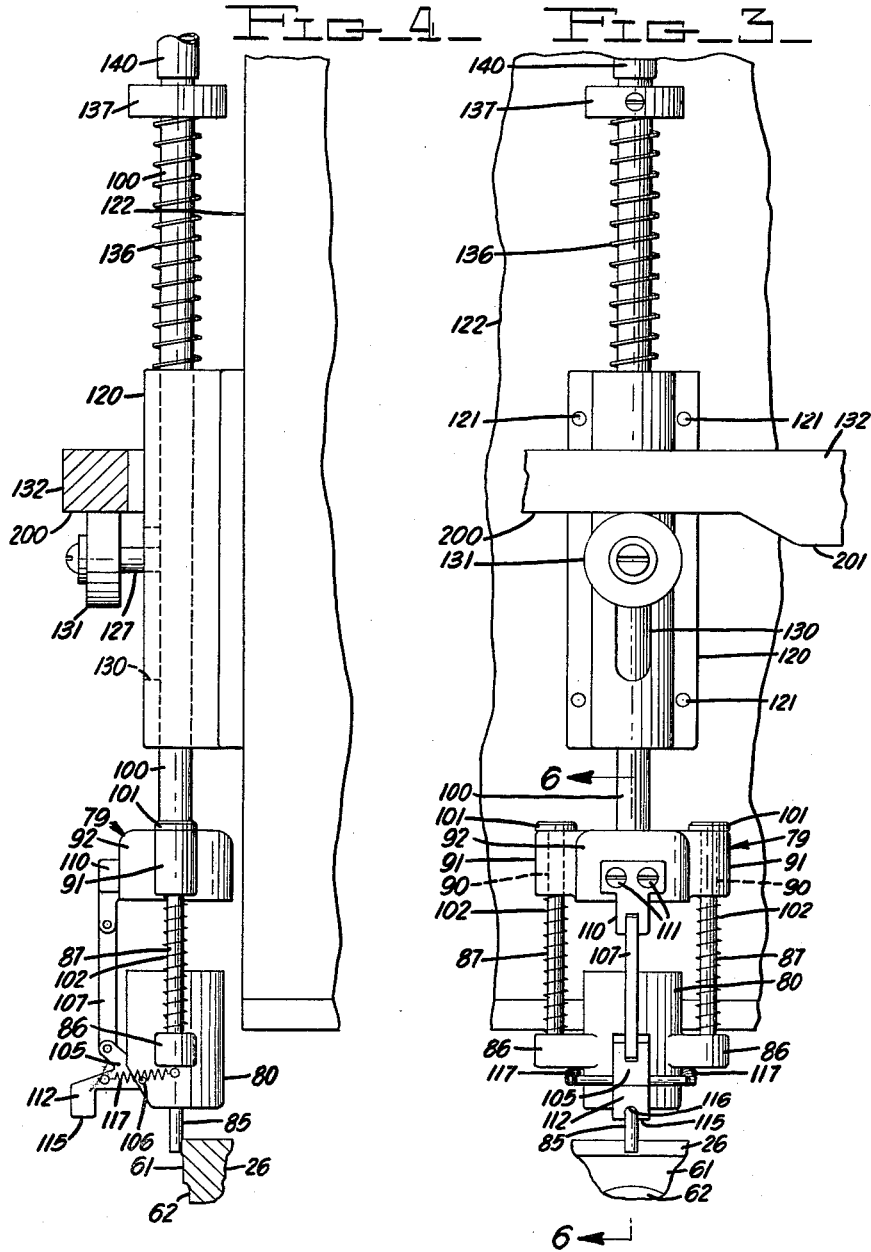

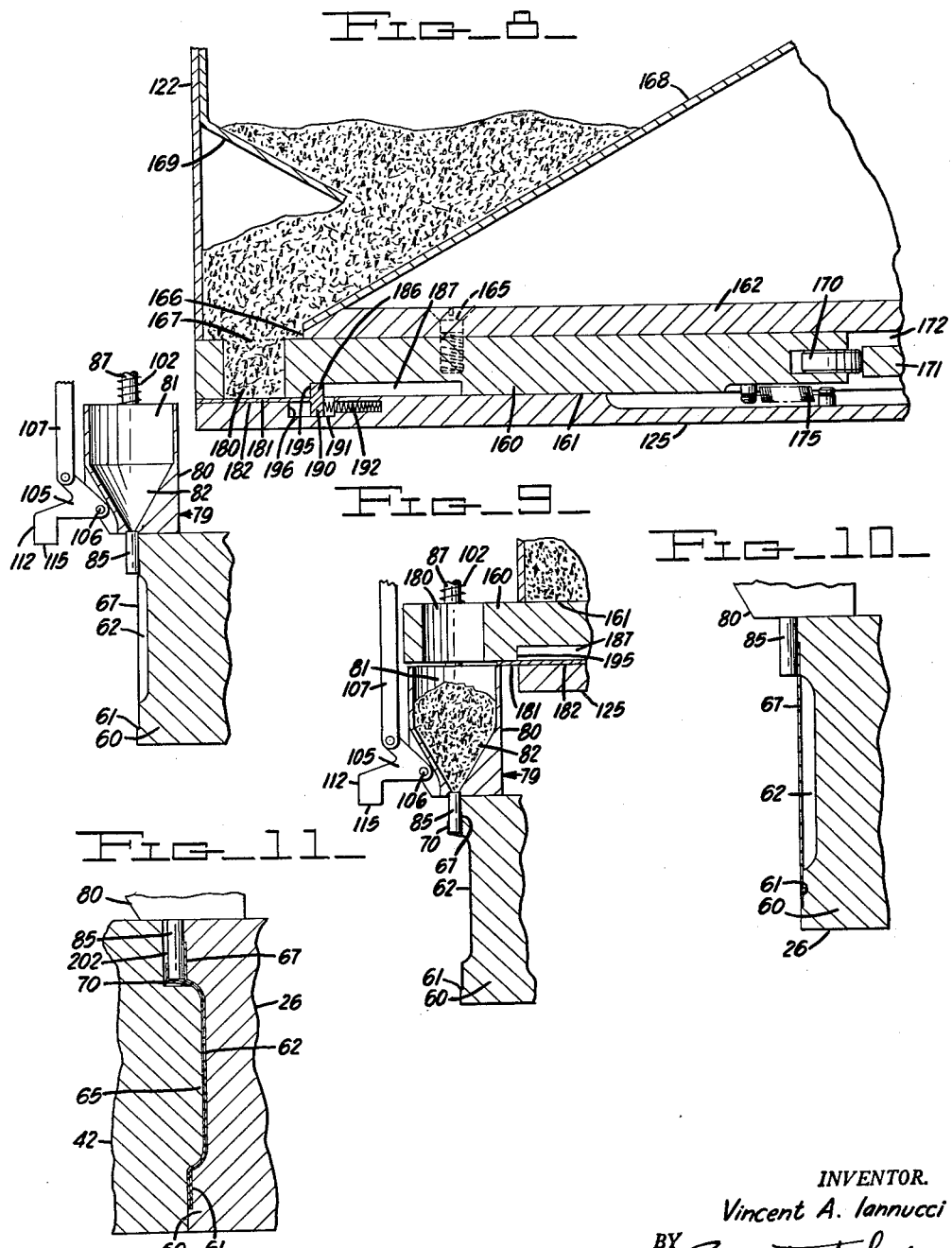

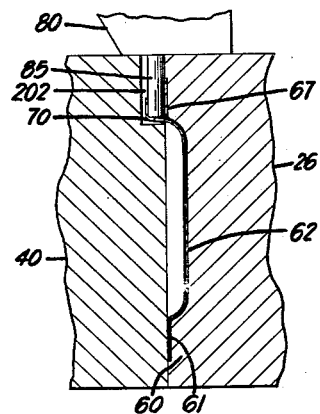
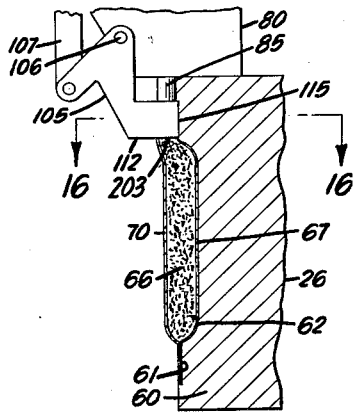
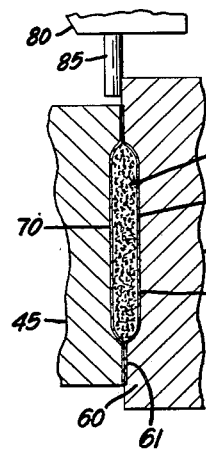
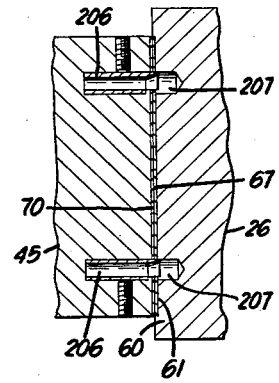
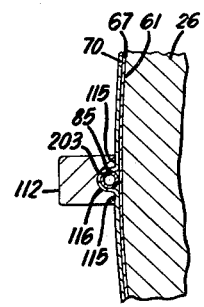

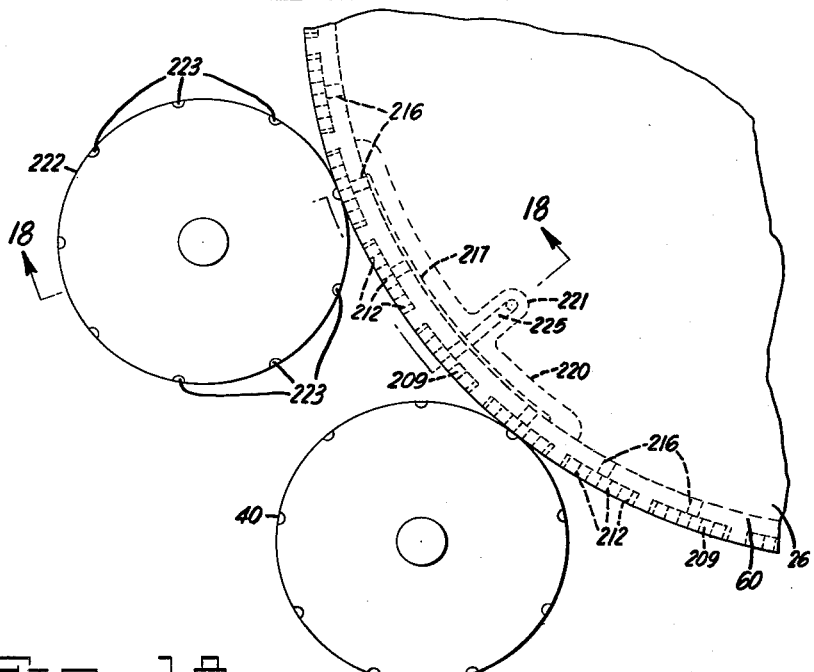
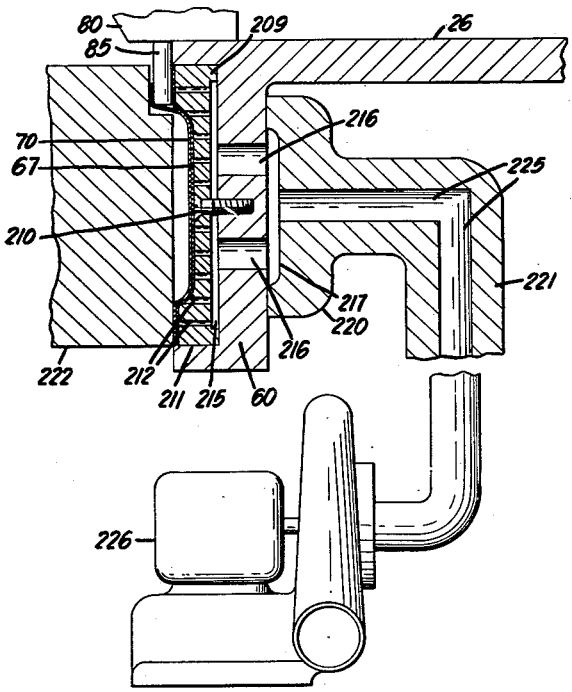

July 6, 1965

V. A. IANNUCCI 3,192,684

APPARATUS FOR MAKING PACKAGE TAPES

Filed March 12, 1962

INVENTOR
Vincent A. Iannucci
BY
ATTORNEYS

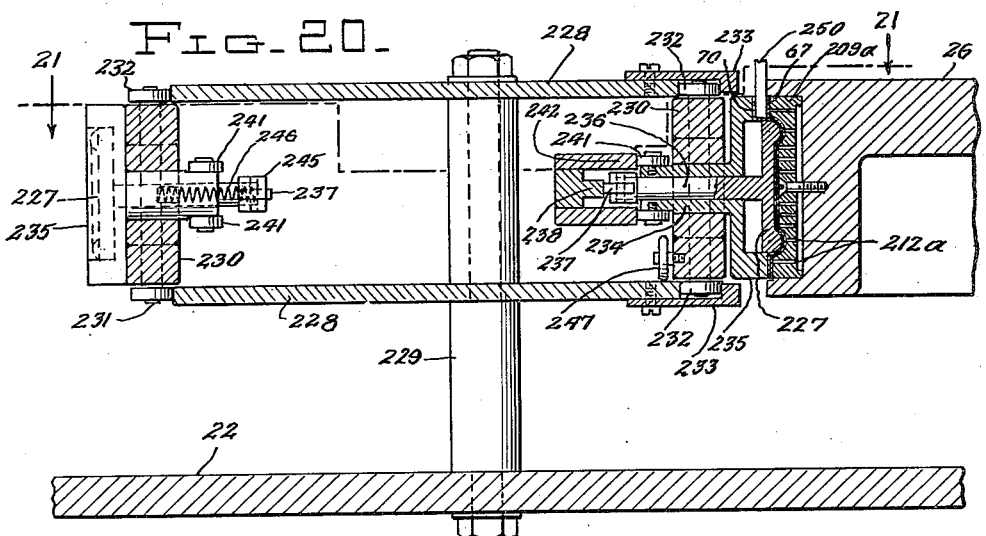
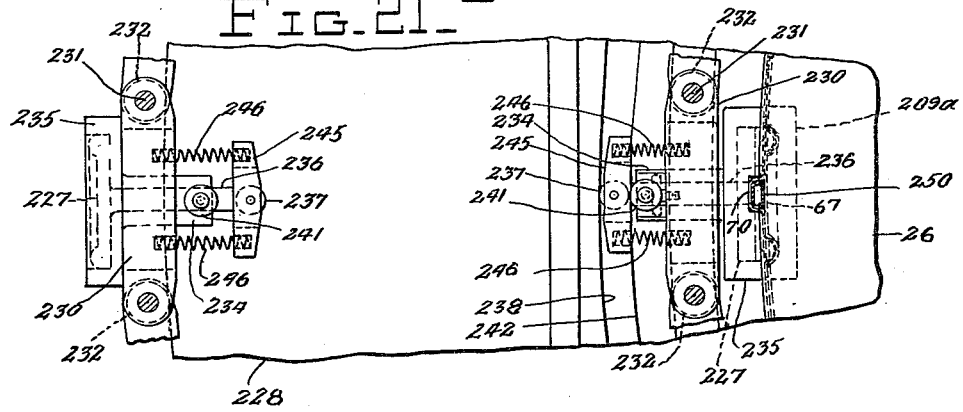
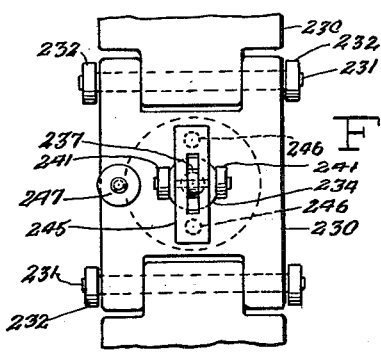
INVENTOR
Vincent A. Iannucci
ATTORNEYS

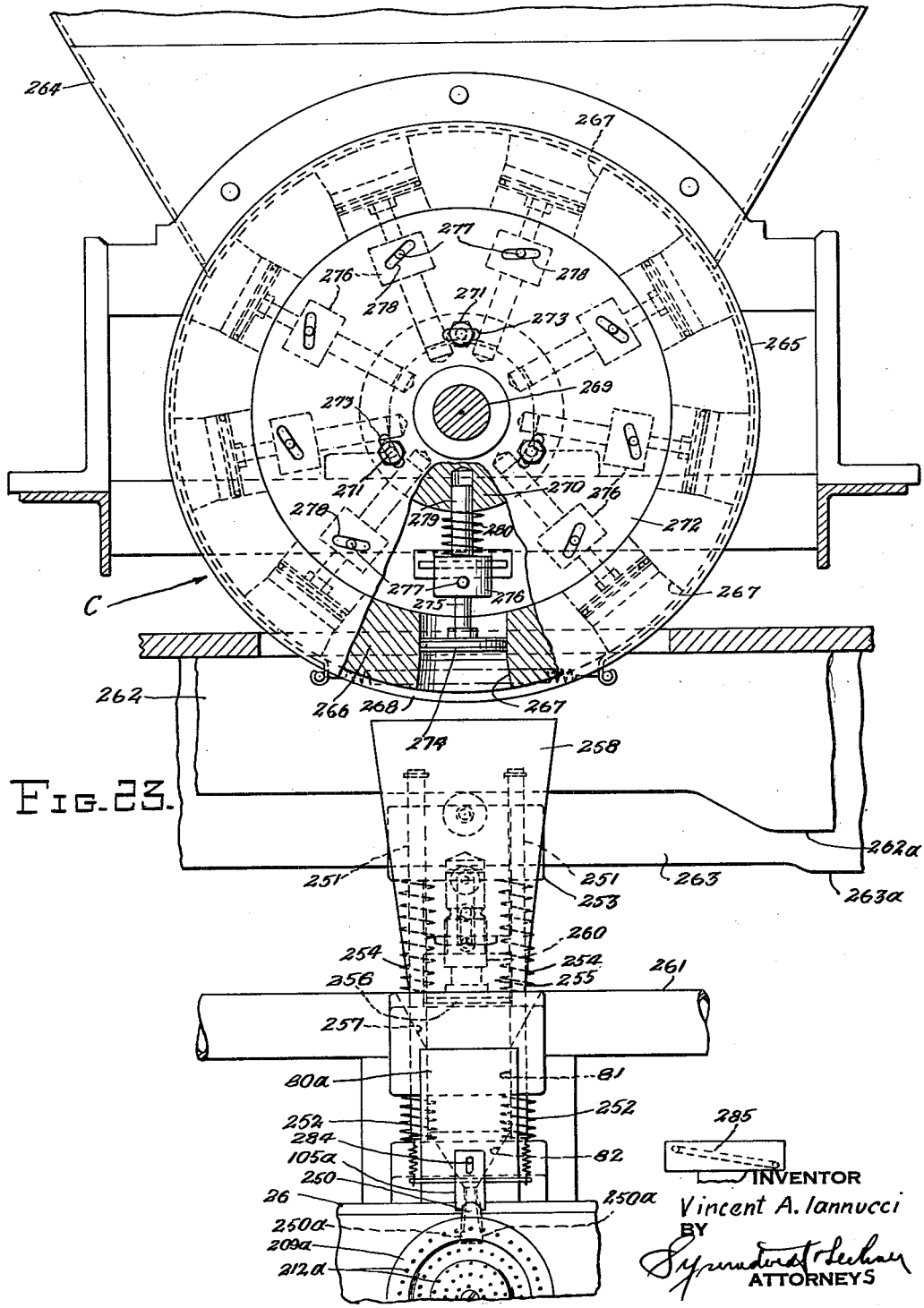

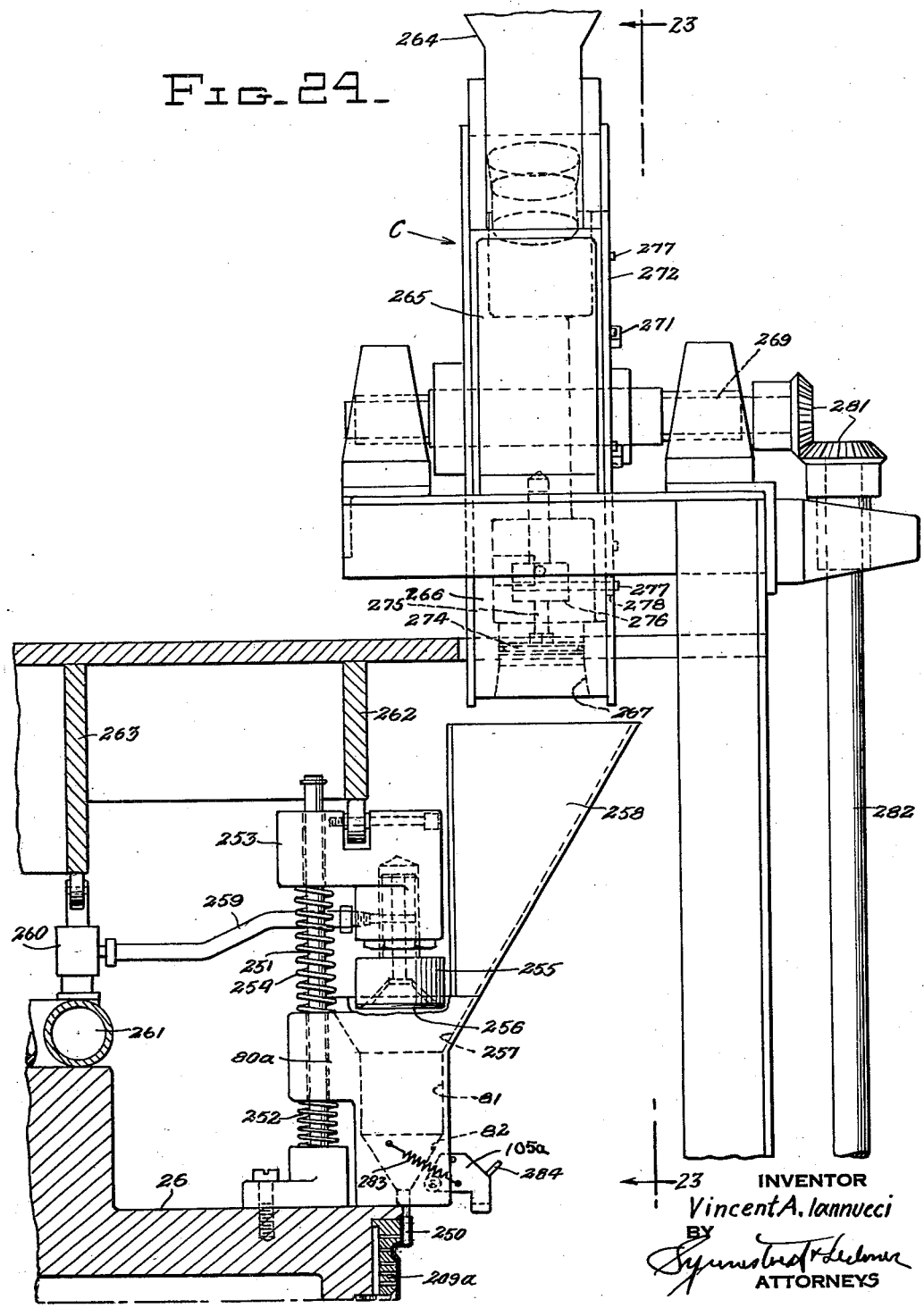

United States Patent Office 3,192,684
Patented July 6, 1965

3,192,684
APPARATUS FOR MAKING PACKAGE TAPES
Vincent A. Iannucci, West Lawn, Pa., assignor to Rudd-Melikian, Inc., Hatboro, Pa., a corporation of Pennsylvania
Filed Mar. 12, 1962, Ser. No. 180,926
2 Claims. (Cl. 53—180)

The present application is a continuation-in-part of my copending application Serial No. 102,043, filed April 10, 1961, now abandoned.

This invention relates to a machine for making packages and more particularly for making packages in the form of tapes having spaced pockets for the material being packaged, for instance powdered or granular material such as coffee for use in liquid dispensing machines and the like, and to a method of packaging. Although various features of the invention may be used for packaging a wide variety of materials, one field in which it is particularly useful is the packaging of granular or powdered beverage materials, such as coffee in which connection the invention is described herebelow.

Tapes of the type referred to for use in dispensing machines are commonly made of two layers of porous paper having pockets formed therebetween for individual measured charges of granular coffee, the porous paper not only readily permitting the flow of boiling water through the paper and coffee to produce cups of brewed coffee but also acting to contain the remaining residue of the granular coffee within the pocket following the brewing operation. Heretofore, in a prior machine for assembling and forming such tapes a lower layer of paper was fed to an endless conveyor having spaced anvils or dies each of which was provided with a dish-shaped depression defining the outline of the pocket to be subsequently formed for the coffee. The operation of the conveyor was intermittent to carry each die to a hopper device having a supply of granular coffee where a ram, associated with the hopper device and having a depression in the underside thereof corresponding in shape to the depression in the die, pressed a measured charge of the coffee and the lower layer of paper into the depression in the die to form the coffee into a briquette on the lower layer of paper. The conveyor was then indexed to advance the die and paper with the briquette of coffee to receive in superimposed relation an upper layer of paper and thence to a heated die which formed the upper layer of paper around the briquette, heat sealed the layers of paper to each other around the briquette and formed pairs of spaced perforations in the sealed layers of paper by means of which the completed tape may be subsequently carried through the dispensing machine. In a subsequent indexing movement of the conveyor the completed tape was carried to and deposited into a container, for instance a shipping carton.

The prior machine was not only slow in operation (only about fifty pockets or pods being formed per minute) but also lacked a desirable degree of accuracy and uniformity in the spacing of the pods and perforations, in the density of the granular coffee in the briquettes, and in the heat sealing of the layers of paper around the outlines of the briquettes. Consequently, while the above noted defects did not preclude the use of the tape in a dispensing machine, a high degree of consistency could not be maintained in the liquid coffee dispensed.

It is therefore an object of the invention to provide an apparatus for making packages and more particularly for making tapes for use in dispensing machines having spaced pockets of granular material through which boiling water is passed to form the brew dispensed thereby, which will overcome the above noted and other disadvantages encountered in the making of such tapes.

Another object of the invention is the provision of means in an apparatus of the type described for forming spaced pockets between superimposed layers of paper and for then injecting a measured charge of granular material into each of the pockets.

A further object is the provision of means in an apparatus of the type described for continuously feeding a pair of layers of paper into superimposed relation with respect to each other, forming spaced depressions in the superimposed layers of paper, sealing the layers of paper to each other around the spaced depressions to define pockets therebetween, and for injecting a measured charge of granular material into each of the pockets.

A still further object is the provision of means in an apparatus for forming pockets of granular material between superimposed layers of paper which means includes a continuously rotating drum having spaced depressions in the periphery thereof, a first mechanism such as a wheel or endless conveyor moving with the drum and having means cooperating with the depressions in the drum to form spaced depressions in the layers of paper defining an unexpanded pocket, a second mechanism such as a wheel for heat sealing the layers of paper to each other around each depression except for a valve opening or charging port communicating with the pocket, means associated with each depression in the drum for injecting under pressure a charge of granular material through the valve opening to expand the pocket and simultaneously fill it, means associated with each injecting means for transferring a measured charge of granular material from a supply thereof to the injecting means, and a third mechanism such as a wheel for heat sealing the layers of paper to each other at the valve opening and for forming spaced perforations in the tape.

With these and other objects in view which will become apparent from the detailed description of the illustrative embodiments of the invention shown in the accompanying drawings, the invention resides in the novel elements, features of construction and cooperation of parts as hereinafter more particularly pointed out in the claims.

In the drawings:

FIGURE 3 is an elevational view on an enlarged scale of a device for injecting the granular coffee into the pocket of the tape and as seen looking in the direction of the arrow A in FIGURE 1;

FIGURE 4 is a side elevation of the injecting device as viewed from the right of FIGURE 3;

FIGURE 5 is a view similar to FIGURE 4 with the parts in different relative positions;

FIGURE 6 is a cross-sectional view on an enlarged scale taken along the line 6—6 of FIGURE 3;

FIGURE 7 is a plan view of a portion of the tape formed by the machine of the instant invention;

FIGURE 8 is a cross-sectional view on an enlarged scale through one of the granular material measuring and transferring devices and taken substantially along the line 8—8 of FIGURE 2;

FIGURE 9 is a view similar to the left portion of FIGURE 8 with the parts shown in different position relative to FIGURE 8;

FIGURE 10 is a cross sectional view on an enlarged scale taken substantially on the line 10—10 of FIGURE 2 and illustrating one step in the formation of the tape;

FIGURE 11 is a view similar to FIGURE 10 taken on the line 11—11 of FIGURE 2 and illustrating another step in the formation of the tape;

FIGURE 12 is a view similar to FIGURE 11 taken on the line 12—12 of FIGURE 2 and illustrating a further step in the formation of the tape;

FIGURES 13, 14 and 15 are views similar to FIGURES 10 and 11 and showing additional steps in the formation of the tape;

FIGURE 16 is a cross-sectional view on an enlarged scale taken on the line 16—16 of FIGURE 13;

FIGURE 17 is a view similar to a portion of FIGURE 2 showing a modified form of the pocket forming means;

FIGURE 18 is a cross-sectional view on an enlarged scale taken substantially along the line 18—18 of FIGURE 17;

FIGURE 19 is a fragmentary plan view of a modified form of apparatus according to the invention, the view being similar in certain respects to FIGURE 2 but being on an enlarged scale as compared with FIGURE 2, and showing a modified arrangement for forming dimples or depressions in the paper strips in which an endless chain type conveyor is employed for carrying the dimpling elements;

FIGURE 20 is a further enlarged vertical sectional view taken as indicated by the line 20—20 in FIGURE 19;

FIGURE 21 is a plan view of parts shown in FIGURE 20, taken as indicated by the line 21—21 on FIGURE 20;

FIGURE 22 is an elevational view of a portion of the endless chain employed in this embodiment;

FIGURE 23 is an elevational view, partly in vertical section, illustrating the mechanism for feeding the material to be packaged in the embodiment of FIGURES 19 to 22, this view being taken as indicated by the line 23—23 applied to FIGURE 24; and FIGURE 24 is a view taken looking to the right in FIGURE 23 and with certain parts also in vertical section, further illustrating the arrangement of the feed mechanism.

The machine of the instant invention is for the purpose of forming a tape having spaced pockets for granular material such as coffee for use in liquid dispensing machines and the like. Specifically the machine includes means for feeding a pair of superimposed layers of paper to a continuously rotating drum having a plurality of depressions spaced around the periphery thereof, means cooperating with the depressions for indenting the superimposed layers of paper to form an unexpanded pocket therein, means for heat sealing the layers of paper to each other around the outside of the pocket outline except for a valve opening or charging port to the pocket, means associated with each depression for injecting a charge of granular material into the pocket by compressed air to expand and fill the same, means associated with each injecting means for transferring a measured charge of the granular material thereto from a supply of such material, means for heat sealing the layers of paper to each other at the valve opening and means for forming spaced perforations in the tape for cooperation with indexing mechanism of the dispensing machine.

Figure 1:
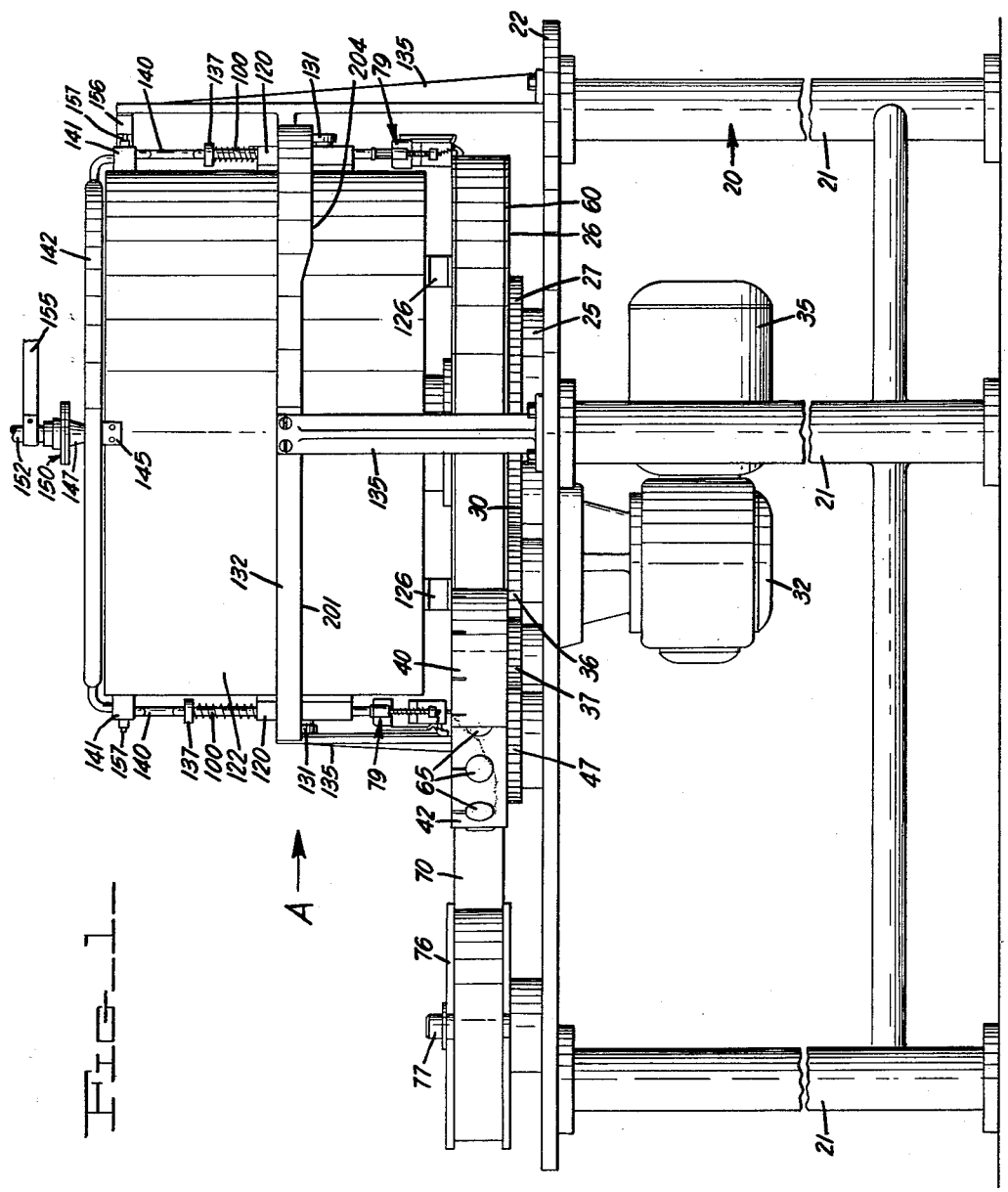
FIGURE 1 is an elevational view of a machine according to the instant invention for forming tape having pockets for granular material such as coffee for use in liquid dispensing machines.
Figure 2:
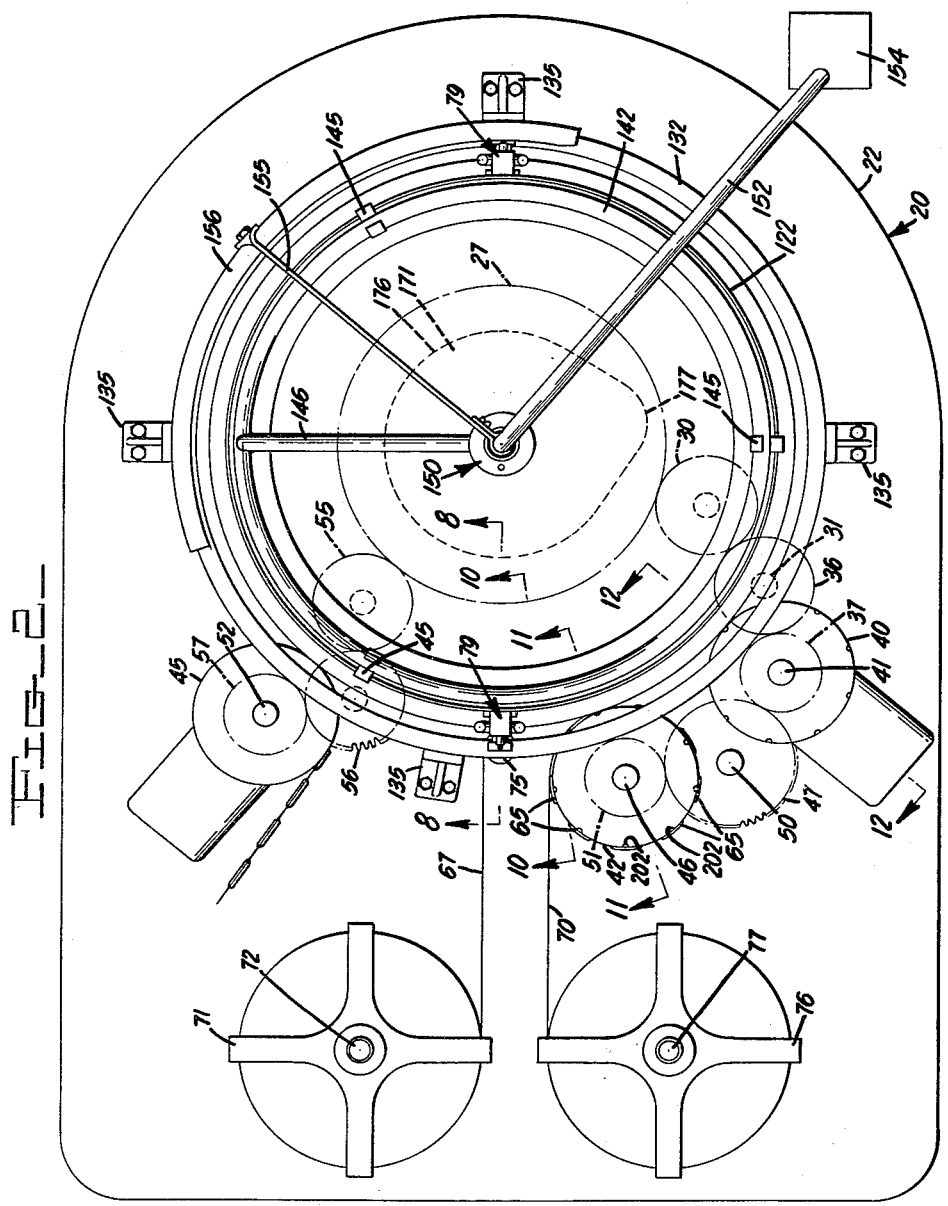
FIGURE 2 is a top plan view of the machine of FIGURE 1.

Referring to FIGURES 1 and 2 of the drawings, there is shown a supporting base structure 20 including legs 21 and an upper plate 22 to the upper surface of which is secured an upwardly extending bearing member 25 for rotatably mounting a wheel or drum 26. A gear 27 secured to the underside of the drum 26 is in meshing engagement with a rotatably mounted idler gear 30 which is in meshing engagement with a gear 36. The gear 36 is in turn in meshing engagement with a gear 37 secured to a wheel 40. Suitably the gear 36 is secured to the output shaft 31 of a gear reduction unit 32 secured to the underside of the plate 22. The input shaft (not shown) of the unit 32 is connected to and driven by an electric motor 35. The ratios of the gears 27, 30, 36 and 37 are such as to rotate the drum 26 and wheel 40 at the same peripheral speeds. The wheel 40 is rotatably mounted on a shaft 41 which is in turn mounted for sliding movement along a line radially of the drum 26, spring means (not shown) being provided to bias the shaft 41 toward the center of the drum to maintain the wheel and drum in resilient engagement. The wheel 40 is adapted to be heated by means (not shown) for purposes to be hereinafter described. Also mounted on the plate 22 at positions radially of the drum 26 and for rolling engagement with the periphery thereof are wheels 42 and 45. Wheel 42 is rotatably mounted on a shaft 46 and is driven at the same peripheral speed as the drum 26 and wheel 40 by an idler gear 47, mounted on a stud or shaft 50 secured to the plate 22, which is in meshing engagement with the gear 37 and a gear 51 secured to the wheel 42. The wheel 45 is rotatably mounted on a shaft 52 which is in turn mounted for sliding movement radially of the drum 26 under the control of spring means (not shown) whereby the wheel 45 is maintained in resilient engagement with the drum in the same manner as wheel 40. The wheel 45 is also adapted to be heated similarly to wheel 40 and is driven at the same peripheral speed as the drum 26 from the gear 27 through meshing idler gears 55 and 56 and a gear 57 secured to this wheel.

The outer periphery of an outer flange 60 of the drum 26 is provided with a shallow annular groove 61 and a plurality of equally spaced dish-shaped depressions 62 (preferably thirty-six in number) which are adapted to receive correspondingly shaped similarly spaced projections 65 formed on the outer peripheral surface of the wheel 42 (FIGURES 2 and 11). Simultaneous rotation of the drum 26 and wheel 42 causes the projections 65 to successively enter the depressions 62 to form superimposed indentations in the inner and outer narrow layers of paper 67 and 70 as the layers of paper are fed between the wheels 42, 40 and 45 and the drum through the rolling engagement therebetween, the indented layers defining a pocket 66 (FIGURES 13 and 14) which is in a collapsed or unexpanded condition at this stage of the operation. As shown in FIGURE 2, the inner layer of paper 67 is withdrawn from a supply reel 71 rotatably mounted on a spindle 72 secured in fixed position on the plate 22 and is guided into the annular groove 61 in the drum 26 by a roller 75 secured to the plate in closely spaced relation to the periphery of the drum. The outer layer of paper 70 is withdrawn from a supply reel 76 rotatably mounted on a spindle 77 secured to the plate 22 and is led directly from the latter reel to the outer peripheral surface of the wheel 42 and thence into superimposed relation with the layer of paper 67. The layers of paper 67 and 70 are of a type that is highly porous to permit the ready flow of water therethrough and are impregnated with an edible adhesive such as glucose which will not affect the flavor of the coffee which is adapted to be heat softened to its adhesive state to permit joining the layers of paper to each other upon the application of pressure for purposes of and in the manner hereinafter set forth.

Associated with each of the depressions 62 in the drum 26 is an injector device generally indicated at 79 including a lower member 80 having an opening 81 the lower end 82 of which is funnel-shaped to communicate with the inner bore of a nozzle 85 secured in the lower end of the member (FIGURES 1, 3, 4, 6, 8 and 9). Fixed in ears 86 projecting from the opposite sides of the lower member 80 are rods 87 which extend upwardly from the lower member to slidingly engage within openings 90 in ears 91 projecting from opposite sides of a closure member 92 (FIGURES 3 and 4). At its underside the closure member is provided with an annular grooved seat 95 (FIGURE 6) for a ring 96 of pliable material such as rubber or the like and an opening 97 communicating with the bore of a rigid tube 100 secured to and extending upwardly from the top of the closure member. The closure member 92 is normally biased to open position relative to the member 80 (FIGURES 3, 4 and 5) against head portions 101 on the rods 87 by coil springs 102 which encircle the rods between the ears 86 and 91 of the members 80 and 92, respectively. The closure member 92 is also adapted to be moved downwardly on the rods 87 (FIGURE 5) to engage the ring 96 with the upper surface of the member 80 to close and form an airtight seal between the openings in the member 80 and closure member 92 for purposes of and by means hereinafter set forth.

A lever 105 pivotally mounted on a pin 106 carried in the member 80 is pivotally connected by a link 107 to a bracket 110 secured by screws 111 to the closure member 92 (FIGURES 5 and 6). At its outer end, lever 105 is provided with a nose portion 112 having a flat surface 115 and a groove 116 extending inwardly therefrom. Coil springs 117 connected to opposite sides of the lever 105 and the member 80 tends to bias the lever in a counterclockwise direction, as viewed in FIGURE 5. In the open position of the members 80 and 92 the lever 105 is positioned by the link 107 as shown in FIGURES 4 and 6. When, however, the members 80 and 92 are moved to closed position as hereinafter set forth, the link 107 and springs 117 act to turn the lever 105 in a counterclockwise direction to resiliently engage the flat surface 115 with the periphery of the drum 26, the nozzle 85 at this time being enclosed within the groove 116 for purposes hereinafter described (FIGURES 13 and 16).

The tube 100 is slidably journalled in a bracket 120 which is secured by rivets 121 or the like to the outer surface of a circular hopper 122 for a supply of the granular coffee or other material to be enclosed by the paper strips. The side wall of hopper 122 is secured to a flange member 125 (FIGURES 8 and 9) which forms the lower or bottom wall of the hopper and the flange member is in turn supported on and secured to the upper surface of the drum 26 by spaced brackets 126 (FIGURE 1). As best seen in FIGURES 3 and 4, a pin 127 secured to the tube 100 and extending outwardly therefrom through an elongated slot 130 in the bracket 120 rotatably supports a roller type follower 131 for engagement with a cam ring 132 which is mounted in fixed position concentrically of the drum 26 on brackets 135 secured to and extending upwardly from the upper surface of the plate 22 (FIGURES 1 and 2). A coil spring 136 surrounding the tube 100 and positioned thereon between the upper surface of the bracket 120 and a collar 137 secured to the tube adjacent its upper end maintains the follower 131 in engagement with the cam ring 132.

The upper end of the tube 100 is connected by a flexible tube 140 to the outlet side of an air valve 141 secured to the outer surface of the hopper 122. The inlet side of the valve 141 is connected into a hollow tubular ring or manifold 142 which is supported on the hopper 122 for rotation therewith by brackets 145 secured to the side wall of the hopper (FIGURES 1 and 2). The manifold 142 is provided with a branch 146 which is connected into the outlet side of one member 147 of a commercial type rotary joint or union 150 such as shown in U.S. Patent No. 2,836,439. The other member 152 of the joint 150 is stationarily supported by a strap 155 secured to an arcuate cam 156 mounted on two of the brackets 135, as shown in FIGURES 1, 2 and 5, and the member 152 is connected to a source of compressed air such as an air compressor indicated diagrammatically at 154 in FIGURE 2. The valve 141 is of a type having a valve stem 157 (see FIGURE 5) which is normally biased outwardly to closed position to arrest the flow of air from the pressure source and the valve stem is adapted to be moved inwardly to open position by engagement with the cam 156 to permit the flow of air through the tube 100 for purposes hereinafter set forth.

Each of the injector devices 79 has associated therewith means for measuring and transferring a charge of coffee from the hopper 122 into the opening 81, 82 of the member 80 of the injector device. The means for this purpose includes a member 160 which is mounted for sliding movement in a radially extending slot 161 formed in the flange member 125 (FIGURE 8). The members 160 associated with each of the devices 79 are retained in their respective slots 161 by a circular cover plate 162 secured to the flange member 125 by screws such as shown at 165. As shown in FIGURE 8 an outer edge 166 of the cover plate 162 is spaced from the side wall of the hopper 122 to define a narrow annular opening 167. A conical shield 168 secured to the cover plate 162 directs the granular coffee toward the annular opening 167 and an annular baffle 169 secured to the side wall of the hopper 122 and overlying the annular opening prevents the weight of the coffee from exerting excessive pressure at the annular opening when the hopper is filled.

At its inner end the member 160 carries a roller 170 for engagement with a cam 171 which is mounted in fixed position on the bearing member 25 within a circular opening 172 formed in the flange member 125. A spring 175 connected between the underside of the member 160 and the flange 125 maintains the roller in following engagement with low and high cam surfaces 176 and 177, respectively (FIGURE 2), of the cam 171, the low surface permitting movement of the member 160 under the influence of the spring to an inner or retracted position and the high surface acting to move the member outwardly to an advanced or projected position against the tension of spring 175.

Adjacent its outer or forward end, member 160 is provided with a circular opening 180 which is adapted to register with the annular opening 167, when the member 160 is in retracted position, to receive a measured charge of the granular coffee from the supply in the hopper. A plate 181 slidably mounted in a recess 182 formed in the flange member 125 beneath the member 160 acts to close the bottom of the opening 180 when the member 160 is in retracted position. At its rear end, the plate 181 is provided with an upwardly extending portion 186 for engagement in a groove 187 formed in the lower surface of the member 160 and a downwardly extending portion 190 adapted to engage in a groove 191 in the flange member 125. A compression spring 192 positioned between the rear surface of the portion 190 and the flange member 125 biases the portion 186 against a wall 195 at the forward end of the slot 187 when the member 160 is in its retracted position of FIGURE 8. When the member 160 is moved to its advanced position, the spring 192 also advances the plate 181 until the lower portion 190 engages a wall 196 at the forward end of the groove 191 (FIGURE 9), the movement of the plate at this time acting to maintain the bottom of the opening 180 closed until the opening 180 is over the opening 81, 82 in the member 80.

Prior to reaching the feeding path of the inner layer 67 of paper the follower 131 of each injector device 79 is in engagement with a low surface 200 of the cam ring 132 to position the injector device in a high inactive position in which the member 80 and closure member 92 are in fully open position relative to each other and the lower end of the nozzle 85 is above the annular groove 61 in the drum 26 as shown in FIGURES 3 and 4. Also at this time, the slide member 160 is in retracted position through engagement of the roller 170 with the low surface 176 of the cam 171 and the opening 180 in the slide member has received a charge of coffee from the supply in the hopper 122. As each injector device 79 rotates with the drum past the roller 75 which guides the inner layer 67 of paper into the annular groove 61 in the drum 26, the follower 131 engages a surface 201 of intermediate height on the cam ring 132 to move the member 80 and closure member 92 downwardly to the same extent to engage the lower surface of the member 80 with the upper surface of the drum 26 and to project the nozzle 85 downwardly over the inner layer 67 of paper, as shown in FIGURE 10.

As the drum 26 and device 79 continue to rotate the nozzle 85 is carried beneath the outer layer 70 of paper and the wheel 42 as the outer layer of paper is superimposed on the inner layer of paper and as the two layers of paper pass between the wheel 42 and drum 26 they are indented by the projection 65 and depressions 62 on the wheel and drum, respectively, to form the unexpanded pocket 66. As the nozzle passes between the wheel and drum at this time it enters a notch 202, one such notch being formed in the outer surface of the wheel on the vertical center of each of the projections 65, the walls around the notch acting to press the outer layer of paper around the nozzle to form a valve opening or charging port 203 between the layers of paper and communicating with the pocket 66 as shown in FIGURES 13 and 16.

As the drum 26 continues to rotate the indented layers of paper are carried into registry with the wheel 40, which is also provided with notches similar to the notches 202 in the wheel 42 to clear the nozzle 85 and the valve opening 203, the wheel 40 acting through heat and pressure to seal the layers of paper to each other entirely around the periphery of the unexpanded pocket except at the valve opening (FIGURE 12). During continued rotation of the drum 26 following sealing of the layers of paper to each other, the roller 170 rides from the low surface 176 to the high surface 177 of the cam 171 to move the slide member 160 from the retracted position of FIGURE 8 to the fully advanced position of FIGURE 9 to drop the charge of coffee from the opening 180 into the opening 81, 82 in the member 80. During the initial advancing movement of the slide member 160 at this time, the plate 181 is also advanced with the slide member by the spring 192 to maintain the bottom of the opening 180 closed until the forward edge of the plate overlies the upper surface of the member 80 and the slide member then continues to its fully advanced position as above set forth. As the drum 26 and injector device 79 continue to rotate following delivery of the charge of coffee to the member 80, the roller 170 rides from the high to the low surface of the cam 171 to again move the slider member 160 to retracted position to recharge the opening 180 from the supply of coffee.

During continued rotation of the drum and device 79, the follower 131 rides from the surface 201 to a high surface 204 (see FIGURES 1 and 5) of the cam ring 132 to move the closure member 92 downwardly into engagement with the upper surface of the member 80 to close and seal the opening 81, 82 therein. Simultaneously with the movement of the closure member 92 to closed position, the lever 105 is turned counterclockwise from the position of FIGURE 6 to the position of FIGURE 5, the walls of the groove 116 at this time pressing the layer of paper at the valve opening against the nozzle 85 and the flat surface 115 engaging and pressing the tape at opposite sides of the valve opening against the periphery of the drum 26, as shown in FIGURE 16. As the drum 26 and device 79 continue to rotate, the valve stem 157 engages and is moved to open position by the cam 156 to permit the compressed air to flow through the tube 100 and into the upper end of the opening 81 in the member 80 to eject the charge of coffee through the nozzle to separate the superimposed indented paper layers at the pocket and to expand and fill the same as shown in FIGURE 13.

Following ejection of the coffee into the pocket 66, as the drum and injector device continue to rotate, the valve stem 157 is carried out of engagement with the cam 156 thereby permitting the valve 141 to close and arrest the flow of air through the tube 100 and the follower 131 rides from the high surface 204 to the low surface 200 of the cam ring 132 to raise the closure member 92 to open position relative to the member 80 and to withdraw the nozzle 85 from the valve opening 203. As the drum continues to rotate the tape is carried beneath the heated wheel 45 to close and seal the valve opening 203 to each pocket, as shown in FIGURE 14. Also as the tape is carried between the drum and wheel 45 spaced pairs of punches 206 mounted in the periphery of the wheel and cooperating with correspondingly spaced openings 207 in the drum form spaced perforations 208 in the tape as shown in FIGURES 7 and 15. From the wheel 45 the completed tape continues to a container (not shown) of any desirable form.

FIGURES 17 and 18 illustrate a modified form of mechanism incorporating the invention for initially indenting the layers of paper 67 and 70 to form the pockets 66. In this form of mechanism each of the depressions 62 is formed in an insert member 209 which is secured by means of a screw 210 in a circular recess 211 formed in the outer flange 60 of the drum 26. The insert member 209 is provided with a plan openings 212 which extend transversely through the insert member to communicate with a circular recess 215 formed in the rear face of the insert member. The recess 215 in turn communicates through openings 216 in the flange 60 of the drum with a recess 217 formed in a foot portion 220 of a bracket 221 secured to the upper surface of the plate 22. As shown in FIGURES 17 and 18 the foot portion 220 is in engagement with the inner surface of the flange 60 and is of an arcuate length that the recess 217 covers the openings 216 associated with the insert members 209 from at least the point they pass a wheel 222, similar to the wheel 42, and the point they pass the wheel 40. The wheel 222 has a smooth outer periphery and is provided with notches 223, similiar to the notches 202 in the wheel 42, to clear the nozzles 85 of the injector devices 79. A passageway 225 in the bracket 221 communicating at one end with the recess 217 in the foot portion 220 has its other end connected to the intake side of a suction fan or pump indicated at 226 in FIGURE 18.

With this arrangement, as the drum 26 is rotated to carry the layers of paper 67 and 70 beneath the wheel 222, the openings 216 associated with each insert member 209 are moved into registry with the recess 217 in the foot portion 220 and the vacuum created therein by the suction fan 226 acts to draw the layers of paper into the depression 62 and form the outline of the pocket 66. As the drum 26 continues to rotate the vacuum maintains the layers of paper in the depression 62 as the layers of paper pass beneath the wheel 40 and are sealed to each other as hereinbefore set forth.

Turning now to the modified arrangement of FIGURES 19 to 24 inclusive it is first to be noted that many of the general arrangements of the machine of the modified form are the same as already fully described above. There are, however, certain differences as will be fully developed herebelow and these differences deal principally wth two phases of the structure and operation, i.e., (1) the mechanism for indenting or dimpling the paper strips to form the pockets or pods for the reception of the material to be packaged, and (2) the mechanism for measuring the charges of material delivered to the formed pods.

Considering first the modified arrangement for effecting the dimpling, attention is now directed to FIGURES 19 to 22 inclusive. In those figures the wheel or drum is again indicated by the numeral 26 and the mounting and driving arrangements for that wheel are the same as those described previously. As in the modification of FIGURES 17 and 18, the wheel 26 is provided with a plurality of cavities around the periphery for receiving inserts 209a (see FIGURE 20) which are provided with ports or apertures therethrough 212a as in FIGURE 18 for cooperation with vacuum mechanism indicated in outline at 220a. In the arrangement of FIGURES 19 to 22, however, the vacuum is not relied upon to effect the dimpling operation as seen in FIGURES 17 and 18, but is utilized to maintain the paper strips indented into the cavities formed in the inserts 209a following the dimpling operation and until the heat sealing effected by the rotative sealing wheel 40a is accomplished, this wheel being of the kind already described and also illustrated in FIGURES 1, 2 and 12.

A positively acting mechanical dimpling mechanism is utilized in the embodiment of FIGURES 19 to 22, as in the embodiment of FIGURES 1 to 16, but in the arrangement of FIGURES 19 to 22 the dimpling mechanism takes a different form, as will be fully described. However, before turning to that description, it is here noted that the cavity formed in the inserts 209a is of a somewhat different shape than that illustrated in the embodiment of FIGURES 1 to 16 or in the embodiment of FIGURES 17 and 18. This cavity (see FIGURE 20) comprises a circular recess in the insert 209a similar to the recess in the insert 209 shown in FIGURE 18, but having at the periphery of the recess a further annular indentation. The dimpling plunger 227 is correspondingly shaped as clearly appears in FIGURE 20 and thereby provides for additional stretching of the paper at the periphery of each of the pockets or pods being formed. This has been found desirable in order to increase the uniformity of thickness of the charged pod substantially throughout the area thereof, instead of having such pods taper off to lenticular shape at the periphery.

One of the chief differences in the dimpling mechanism of FIGURES 19 to 22 and that shown in the first embodiment is that whereas a wheel 42 was used in the first embodiment, the mechanism of FIGURES 19 to 22 incorporates an endless chain with kidney shaped guides in order to maintain the dimpling elements in engagement with the tape strips on the drum throughout a substantial arc of the motion of the drum. As seen in FIGURES 19 and 20, the support or mounting plate 22 of the machine, on which the rotative drum and other parts are mounted, is also used to carry the kidney shaped guide plates 228 which are supported on the plate 22 by means of standards and spacers such as shown at 229. Traveling around the guides 228 is a series of conveyor or chain links 230 interconnected by pins 231 and each pin carrying rollers 232 at its ends adapted to ride on the edges of the guides 228, the position of the rollers 232 being further guided at the concave side of the guide plates 228 by means of additional guide elements 233 (see FIGURES 19 and 20).

Each of the links 230 carries certain movable parts adapted to cooperate with the tape strips on the drum. For this purpose each link is centrally apertured to receive the central tubular part 234 of a masking element 235 and the stem 236 which carries the dimpling plunger 227 projects through the part 234 of the masking device. At the inner end of the stem 236 a cam follower roller 237 is arranged, this roller cooperating with a cam 238 (see FIGURES 19 and 20) which is mounted at its ends by means of brackets 239 and is yieldingly urged toward the drum by means of springs 240.

Similarly the inner end of the tubular part 234 of the masking device is provided with a pair of cam follower rollers 241 which ride on cam elements 242 which are supported toward their ends by brackets 243 (see FIGURE 19), springs 244 being again included in the mounting for the cams so that the cams are yieldingly urged toward the drum 26.

The inner end of the stem 236 of each dimpling plunger also carries a double bracket or beam 245 cooperating with a pair of compression springs 246 which react against the back side of each link 230, thus serving to urge the dimpling plunger 227 toward the link on which it is mounted, this action serving also to draw the surrounding masking element 235 toward the link as is seen toward the left of FIGURES 20 and 21. These beams 245 and the springs 246 have been omitted from the illustration in FIGURE 19 in order to avoid confusion of parts and to permit clearer illustration of the cam elements 238 and 242 in that figure.

Each of the links 230 is also provided with a roller 247 (see FIGURES 20 and 22), this roller riding on the inside or inner surface of the guide plate 228 and thus serving to carry the load of the links in their traveling motion around the edges of the guide plates 228.

Attention is now called to the fact that as illustrated in FIGURE 19 the inner and the outer paper strips 67 and 70 are fed to the drum in positions somewhat different from that illustrated in FIGURE 2. Moreover these strips are both fed to the drum by means of guide rollers 248 and 249. In between the points of delivery of the two strips to the drum the charging nozzle 250 which appears in FIGURES 20 and 21 and also in FIGURES 23 and 24 discussed herebelow is brought down into operating position as described above in connection with the first embodiment (see FIGURE 10), the edge of the second of the two strips being laid over the charging nozzle (see FIGURE 20).

As the drum turns in the direction indicated by the arrow R in FIGURE 19 the strips are carried through the region of the dimpling mechanism, and during this travel, the following operations take place:

First the cam 242 commences the advancement of the masking element 235 and this element is brought close to the paper strips against the drum but not yet in tight gripping engagement therewith.

Second the cam 238 advances the dimpling plunger 227, a portion of this motion taking place during a portion of the motion of the masking element just referred to, and the cam for the dimpling plunger drives the dimpling plunger home before the cam for the mask drives the mask home. The reason for arranging the cams to effect this sequence of operations is that it is desired to have the mask close to the paper during the dimpling operation but not tightly engaging it. The dimpling operation requires the paper to give and stretch in the region surrounding the pod being formed and this action would be prevented if the mask were in tight engagement with the paper against the drum when the dimpling plunger is driven home. In the position of the parts at about the region through which the section line 20—20 is applied to FIGURE 19, the dimpling plunger and the mask have both been driven home by their respective cams. This condition is maintained through an arcuate travel preferably equal to at least twice the angular spacing of the stations or cavities on the drum, so that at least two dimpling plungers and masks are in full engagement with the drum at all times.

The foregoing is of importance for several reasons. In the first place the constant interengagement of several dimpling plungers with the drum enables the dimpling mechanism to be driven directly by the drum, rather than through a separate drive mechanism. Additionally, the maintenance of tight engagement of the dimpling plunger with the paper strips in the cavities on the drum for some appreciable interval of time is desirable in order to effectively form a pod or pocket, particularly where, as is desired, the machine is to be operated at a high rate of speed, for instance of the order of 14 r.p.m. of the drum, which with 36 stations around the drum would correspond to a production rate of about 500 pods per minute.

The type of dimpling mechanism illustrated in FIGURES 19 to 22 is further of advantage in that it acts to form a more accurate pod than is obtainable where only a rolling contact of the dimpling mechanism with the drum is provided for, as in the embodiment illustrated in FIGURES 1 to 16. Greater uniformity of the pods is thereby provided for with the arrangement of FIGURES 19 to 22.

After leaving the dimpling mechanism, the collapsed pods thus formed are maintained in that condition by the vacuum system 220a until the heat sealing is effected by the roller 40a, in the manner hereinbefore described with reference to the first embodiment. This initial heat sealing occurs all the way around the pod except for the charging port in which the charging nozzle 250 is now positioned. Following this sealing, charges of coffee or other material being packaged are introduced through the charging nozzle and this may be accomplished by means of the type of mechanism illustrated in the figures of the first embodiment, after which the charging nozzle is withdrawn and the final sealing operation is performed so as to close the charging port, this being accomplished by means of a sealing roll 45a which may be of the same construction, arrangement and operation as described above, although it will be noted from comparison of FIGURE 19 with FIGURE 2 that the final sealing roll 45a has been shifted somewhat in the clockwise direction around the drum as compared with the position of the sealing roll 45 in FIGURE 2. The finally sealed and completed tape having the pods 66 is delivered from the drum just following the sealing roll 45a, as appears toward the top of FIGURE 19.

Instead of employing the type of charging mechanism illustrated in FIGURES 1 to 16 inclusive, an alternative embodiment of such a mechanism may be used, as illustrated in FIGURES 19, 23 and 24. This alternative charging mechanism is arranged as follows:

Beginning with the charging nozzle 250 which appears toward the bottom of each of FIGURES 23 and 24, it will be noted that this nozzle depends from the lower tapered portion 82 of the charge receiving cavity 81, these cavities being formed within the member 80a which is mounted for vertical motion by means of a pair of guide rods 251, compression springs 252 acting to urge the charging member 80a upwardly for withdrawal of the nozzle 250, which occurs in the cycle of operation just before the heat seal 45a operates to close the charging port. Also mounted on the upright rods 251 is a pressure head 253, compression springs 254 being interposed between the members 80a and 253 and these springs being heavier than the springs 252 so that upon downward movement of the block 253, the member 80a first moves downwardly with the block 253 compressing springs 252, until the member 80a abuts the top of the drum 26, whereupon further downward movement of the block 253 compresses springs 254 and the block 253 moves downwardly toward the member 80a.

Block 253 yieldingly carries a fluid pressure head 255 having a rubber sealing ring 256 at its lower edge adapted to engage the tapered wall of the entrance cavity 257 of the charge receiving member. A charging funnel 258 is arranged to deliver into the tapered cavity 257, and in the operation of the apparatus, when a charge of coffee or the like has been delivered through the funnel 258 into the cavity 257 and thence into the cylindrical chamber 81, the block 253 descends and causes the pressure head 255 to seal against the tapered wall of the cavity 257, the head 255 being yieldingly mounted on the block 253 but having pressure connections extended therethrough to the flexible pressure supply line 259 which is connected with the outlet side of a valve 260, the inlet side of which communicates with the supply or pressure manifold 261. The operation of the block 253 and of the valve 260 is controlled by cams 262 and 263 having lobes 262a and 263a (see FIGURE 23), the cams being shaped to provide a sequence of operations which is referred to hereinafter following description of the measuring apparatus which is also illustrated in FIGURES 23 and 24.

At a point around the drum just beyond the location of heat seal 40a, for instance in the region indicated at C at the bottom of FIGURE 19 there is arranged a measuring apparatus including, as shown in FIGURES 23 and 24 a supply funnel or reservoir 264 which delivers powdered or granular material, such as coffee, downwardly into a casing 265 within which is mounted a rotative measuring device or wheel comprising an annulus or ring 266 having a series of measuring cavities 267 formed therein and opening radially outwardly through the outer periphery of the ring. These cavities 267 receive coffee from the funnel or bin 264 at the upper side of the wheel and carry the charges downwardly for delivery into the funnels 258 of the several charging devices which are carried by the drum, the casing 265 having an opening in the region indicated at 268 for the purpose of permitting delivery of the charges from the measuring wheel into the funnels 258 as they pass the measuring station. The cavities 267 are preferably outwardly flared toward the periphery of the measuring wheel to facilitate discharge of the material being loaded.

The wheel device within the casing 265 is mounted by means of a central shaft 269 having a hub member 270 keyed thereto. Fastened to the hub 270 by means of bolts and nuts 271 is a plate 272, the plate having circumferentially elongated slots 273 therein providing for angular adjustment of the plate with respect to the hub 270.

In each of the cavities 267 of the ring 266 there is a movable piston or plunger 274 having a stem 275 with which a block 276 is connected, this block being provided with a projecting pin 277 engaging in an inclined slot 278 formed in the plate 272. Radially inwardly of each block 276 is a pin or rod 279 slidable in a radial cavity in the hub member 270, and a compression spring 280 surrounding the pin 279 reacts between the hub 270 and the block 276.

By the foregoing mechanism including the pistons 274, it is possible to adjust the volume of the charge being measured and delivered to each pod. This is accomplished by loosening the nuts 271 and then shifting the plate 272 with respect to the hub 270, thereby angularly moving the elongated slots 278 with respect to the pins 277 and thus shifting pistons 274 in a radial direction either inwardly or outwardly so as to adjust the volume of the cavities 267 which pick up the charges from the bin 264 and deliver those charges to the funnels 258 as they pass the measuring station.

As seen in FIGURE 24 the measuring wheel is driven through its shaft 269 by means of gearing 281 driven from a shaft 282 which may be connected with the power mechanism, for instance with the reduction unit 32 driven by the motor 35 as shown in FIGURE 1, the gearing in this drive and to the drum being properly timed to provide for movement of the measuring cavities 267 sufficiently to bring a new cavity to discharging position each time one of the pods passes the measuring station. With 36 pod forming cavities on the drum 26, as herein illustrated and described by way of example, and with 9 measuring cavities 267 in the measuring wheel as shown in FIGURE 23, the gearing for driving the measuring wheel should provide for rotation of the measuring wheel 4 times for each revolution of the drum 26.

Considering now the sequence of operations performed by the cams 262 and 263, it is first noted that the cam 262 is shaped to provide for movement of the member 80a carrying the charging nozzle 250 from the upper to the lower or operative position at a location between the point of delivery of the first tape strip 67 to the drum and the point of delivery of the second tape strip 70 to the drum. This condition is maintained until a point just beyond the measuring station which is indicated by the letter C at the bottom of FIGURE 19, and at that position the cam 262 has a further lobe which drives the block 253 downwardly thus engaging the pressure head 255 in the cavity 257. Just after the pressure head 255 is driven home, the cam 263 is provided with a lobe so as to open the pressure valve 260 and deliver a blast of gaseous pressure, for instance air, through the pressure head in order to force the charge from the chamber 81 downwardly through the tapered part 82 and thence through the nozzle and into the pod in the manner described above in connection with the first embodiment. Thereafter cam 263 is shaped to close the pressure valve 260, after which cam 262 drops away to permit both the block 253 and the member 80a to rise under the action of the springs 254 and 252, thereby withdrawing the nozzle 250, this action preferably occurring just before the point of final engagement of the heat seal 45a which appears toward the top of FIGURE 19.

A pivoted clamping device 105a (see FIGURE 24) similar to the device 105 described above in connection with FIGURES 3, 4, 8 and 9 is also provided on the lower portion of the member 80a, this device having an over-center spring 283 which will alternatively maintain the device in the upper position as shown in FIGURE 24 or in the lower clamping position which is similar to the position shown in FIGURE 13, this device being provided for the purpose of clamping the outer strip of paper around the nozzle during the charging operation. Instead of operating the memebr 105a through a link such as used in the first embodiment, the member 105a in the arrangement of FIGURES 19 to 24 is operated by cam surfaces adapted to engage a pin 284 projecting from the member 105a. One of these operating cams is shown toward the lower right of FIGURE 23 at 285, the cam merely comprising an inclined bar with the under surface of which the pin 284 is adapted to engage in order to depress the member 105a sufficiently to cause the over-center spring 283 to snap the device downwardly into engagement. The device may similarly be released by a bar type cam illustrated at 286 toward the top of FIGURE 19, at a point just prior to the point at which the nozzle would be withdrawn in preparation of the final sealing operation to close the charging port.

As seen from comparison of FIGURES 20 and 24 with FIGURES 21 and 23 it will be noted that the charging nozzle 250 has a flattened oval shape, and preferably this nozzle is closed at its lower extremity but is opened laterally in the regions at 250a in FIGURE 23. This arrangement improves the uniformity of delivery of the charge throughout the area of the pod being formed and aids in maintaining a substantially uniform density of the granular or powdered material throughout the formed pod.

I claim:

1. In a machine for making a package comprising a pocket containing a packaged material, said machine including a forming drum having a recess in the periphery thereof, means for delivering two superimposed strips of tape material to the periphery of the drum in a position overlying said recess, mechanism cooperating with said drum for dimpling said superimposed strips into said recess to define and pre-shape an unexpanded pocket, said mechanism comprising a dimpling member arranged to travel in an arc conforming with the periphery of the drum, whereby to retain the superimposed strips indented into said recesss throughout a portion of the angular motion of the drum, and a masking element adapted to engage with the strips in the region surrounding said recesses.

2. In a machine for making a package comprising a pocket containing a packaged material, said machine including a forming drum having a recess in the periphery thereof, means for delivering two superimposed strips of tape material to the periphery of the drum in a position overlying said recess, mechanism cooperating with said drum for dimpling said superimposed strips into said recess to define and pre-shape an unexpanded pocket, said mechanism comprising a dimpling member arranged to travel in an arc conforming with the periphery of the drum, whereby to retain the superimposed strips indented into said recess throughout a portion of the angular motion of the drum, a masking element adapted to engage with the strips in the region surrounding said recesses, mounting means providing for yielding engagement of both the dimpling member and the masking element with the strips against the periphery of the drum, and mechanism providing for sequential engagement of said member and said element, with the dimpling member being engaged before the engagement of the masking element.

References Cited by the Examiner
UNITED STATES PATENTS

| | | | |
|---|---|---|---|
| 1,970,193 | 8/34 | Riebel | 53—22 |
| 2,199,210 | 4/40 | Scherer | 53—28 |
| 2,275,654 | 3/42 | Ravenscroft et al. | 53—184 X |
| 2,279,505 | 4/42 | Ravenscroft | 53—182 X |
| 2,390,071 | 12/45 | Barnett | 53—28 |
| 2,497,212 | 2/50 | Donofrio | 53—26 |
| 2,590,379 | 3/52 | Cloud | 53—184 X |
| 2,746,223 | 5/56 | Fischer | 53—180 |
| 2,803,931 | 8/57 | David | 53—180 X |
| 2,976,654 | 3/61 | Vogt | 53—37 |
| 3,038,282 | 6/62 | Hansen et al. | 53—28 |

FRANK E. BAILEY, *Primary Examiner.*

ROBERT E. PULFREY, BERNARD STICKNEY,
*Examiners.*

UNITED STATES PATENT OFFICE
CERTIFICATE OF CORRECTION

Patent No. 3,192,684                 July 6, 1965

Vincent A. Iannucci

It is hereby certified that error appears in the above numbered patent requiring correction and that the said Letters Patent should read as corrected below.

Column 8, line 15, for "plan" read -- plurality of small --.

Signed and sealed this 15th day of February 1966.

(SEAL)
Attest:

ERNEST W. SWIDER
Attesting Officer

EDWARD J. BRENNER
Commissioner of Patents